(12) United States Patent
Frederick et al.

(10) Patent No.: US 10,232,830 B2
(45) Date of Patent: Mar. 19, 2019

(54) INTEGRATED TRUCK BED WASHING

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US); Adam D. Holmstrom, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 16 days.

(21) Appl. No.: 15/635,497

(22) Filed: Jun. 28, 2017

(65) Prior Publication Data
US 2019/0001934 A1    Jan. 3, 2019

(51) Int. Cl.
| | |
|---|---|
| *B05B 15/60* | (2018.01) |
| *B60S 1/66* | (2006.01) |
| *B05B 9/03* | (2006.01) |
| *B05B 3/14* | (2006.01) |
| *B05B 15/70* | (2018.01) |
| *B62D 33/02* | (2006.01) |

(52) U.S. Cl.
CPC ............. *B60S 1/66* (2013.01); *B05B 3/14* (2013.01); *B05B 9/035* (2013.01); *B05B 15/60* (2018.02); *B05B 15/70* (2018.02); *B62D 33/02* (2013.01)

(58) Field of Classification Search
CPC .................................................. B05B 15/60
See application file for complete search history.

(56) References Cited

U.S. PATENT DOCUMENTS

| | | | | |
|---|---|---|---|---|
| 4,955,543 | A * | 9/1990 | Orth | B60S 1/528 239/205 |
| 5,303,866 | A | 4/1994 | Hawks, Jr. | |
| 6,210,492 | B1 * | 4/2001 | Wilson, III | B05B 7/32 134/18 |
| 9,073,690 | B1 | 7/2015 | Hobson | |
| 2002/0162576 | A1 * | 11/2002 | Fratello | B60S 3/04 134/18 |
| 2006/0124154 | A1 | 6/2006 | Rivalto | |
| 2007/0186956 | A1 | 8/2007 | Schlueter | |
| 2012/0266922 | A1 * | 10/2012 | Krahn | B60S 1/52 134/123 |

* cited by examiner

*Primary Examiner* — Jason Y Ko
(74) *Attorney, Agent, or Firm* — Christopher G. Darrow; Darrow Mustafa PC

(57) ABSTRACT

Arrangements described herein include washing systems for vehicle truck beds. The system can include one or more nozzles and one or more conduits operatively connected to the truck bed. In some arrangements, the conduits can be formed integrally with the truck bed, such as being molded with an inner panel of the truck bed. The system further includes a fluid inlet operatively connected to the vehicle that is in fluid communication with the one or more conduits. When a fluid is supplied in the fluid inlet it can be routed to the one or more nozzles for spraying into the truck bed.

20 Claims, 3 Drawing Sheets

INTEGRATED TRUCK BED WASHING

FIELD

The subject matter described herein relates in general to vehicle cargo compartments and, more particularly, to integrated washing systems for vehicle truck beds.

BACKGROUND

Modern vehicles can include compartments to transport cargo. Such compartments can include open cargo areas such as the bed of a pickup truck. The open bed of a pickup truck can allow users to transport a variety of cargo items, such as large or irregular items, dirty items, and loose materials. For example, the bed can be used to transport quantities of dirt, rocks, wood, bricks, etc. Over time the bed of the pickup truck can collect unwanted particles, such as leftover materials. It can be time consuming for a user of the vehicle to manually sweep out, or otherwise clean, the bed of a pickup truck.

SUMMARY

In one respect, the present disclosure is directed to a washing system for a truck bed of a vehicle. The system includes one or more nozzles operatively connected to the truck bed. The system further includes one or more conduits operatively connected to the truck bed and a fluid inlet operatively connected to the vehicle. The fluid inlet is in fluid communication with the one or more nozzles via the one or more conduits. When a fluid is supplied in the fluid inlet it is routed to the one or more nozzles for spraying into the truck bed.

In another respect, the present disclosure is directed to a vehicle having a washing system for a truck bed. The vehicle includes a truck bed defined at least in part by an inner panel having a front portion, two opposing side portions, and a floor portion. The vehicle also includes a washing system. The system includes one or more nozzles operatively connected to the truck bed. The system further includes one or more conduits operatively connected to the truck bed and a fluid inlet operatively connected to the vehicle. The fluid inlet is in fluid communication with the one or more nozzles via the one or more conduits. When a fluid is supplied in the fluid inlet it is routed to the one or more nozzles for spraying into the truck bed.

In yet another respect, the present disclosure is directed to a washing system for a truck bed of a vehicle. The truck bed is at least partially defined by an inner panel having a front portion, two opposing side portions, and a floor portion. The system includes a first set of nozzles operatively connected to the front portion at a first elevational position and a second set of nozzles operatively connected to the front portion at a second elevational position. The second elevational position is higher in an elevational direction than the first elevational position. The system further includes one or more conduits operatively connected to the inner panel. The one or more conduits are in fluid communication with the first and second set of nozzles. The system also includes a fluid inlet operatively connected to the vehicle. The fluid inlet is in fluid communication with the one or more conduits and is configured to receive at least one of a liquid and an air. When a fluid is supplied in the fluid inlet it is routed to the one or more nozzles for spraying into the truck bed.

DETAILED DESCRIPTION

Figure 1:
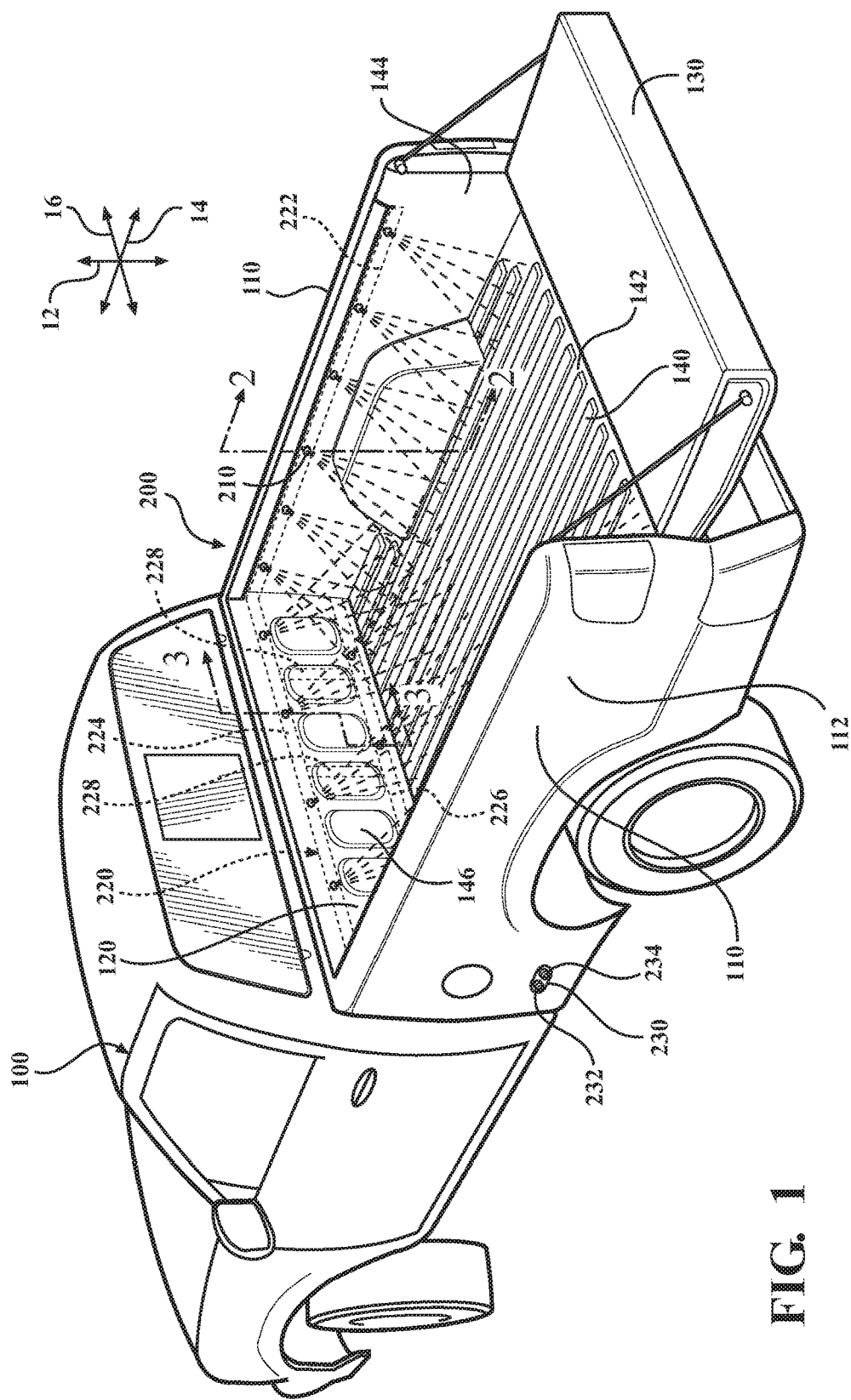
FIG. 1 is an example of a vehicle having an integrated truck bed washing system.

Arrangements described herein include washing systems for vehicle truck beds. The system can include one or more nozzles and one or more conduits operatively connected to the truck bed. In some arrangements, the conduits can be formed integrally with the truck bed, such as being molded with an inner panel of the truck bed. The system further includes a fluid inlet operatively connected to the vehicle that is in fluid communication with the one or more conduits. When a fluid is supplied in the fluid inlet it can be routed to the one or more nozzles for spraying into the truck bed. The present detailed description relates to systems and methods that incorporate one or more of such features. In at least some instances, the washing systems can provide efficient and easy ways for a user to clean out the truck bed of the vehicle. For example, a user may need to only hook up a fluid source to the fluid inlet to allow the washing system to clean the truck bed.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4B, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example vehicle 100 is shown. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle may be a watercraft, an aircraft or any other form of motorized transport. In one or more arrangements, the vehicle 100 can be a pickup truck vehicle having a truck bed. While the vehicle 100 can be a pickup truck as shown in the Figures, it is to be appreciated systems and methods described herein can be utilized in vehicles having other forms of cargo areas. For example, the vehicle 100 can include semi-trucks, vans, minivans, cars, etc.

As shown in FIG. 1, the truck bed of the vehicle 100 can generally include two outer sides 110, a front panel 120, and a tailgate 130. The truck bed can also be at least partially defined by an inner panel 140. The sides 110 can include an outer side panel 112. In one or more arrangements, the inner panel 140 can include a floor portion 142, one or more side portions 144, and a front portion 146. In one or more arrangements, the inner panel 140 can be formed from one unitary structure. For example, the inner panel 140 can be a molded resin panel. Alternatively, the inner panel 140 can be formed from two or more separate elements.

The vehicle 100, the truck bed, and the system 200 can described with reference to an associated elevational direction 12, a longitudinal direction 14, and a lateral direction 16. As used herein, "longitudinal direction" can extend from the front panel 120 to the tailgate 130 of the truck bed. "Lateral direction" can extend between two sides 110 of the truck bed.

In one or more arrangements, an integrated washing system 200 (also simply "system 200") can be included to provide cleaning to the truck bed of the vehicle 100. The system 200 can include various elements. Some of the possible elements of the system 200 are shown throughout the Figures and will now be described. It will be understood that it is not necessary for the system 200 to have all of the elements shown in the Figures or described herein. The system 200 can have any combination of the various elements shown and described. Further, the system 200 can have additional elements to those shown and described. In some arrangements, the system 200 may not include one or more of the elements shown in the Figures. Further, while the various elements are shown as being located within the system 200, it will be understood that one or more of these elements can be located external to the system 200. Further, the elements shown may be physically separated by large distances.

In one or more arrangements, the system 200 can include one or more nozzles 210. The nozzles 210 can be configured to spray a fluid 240 within the truck bed to clean portions of the truck bed. As used herein, "spray" includes any passage of the fluid 240 out of the nozzle(s) 210 and into the truck bed. The fluid 240 can be any suitable fluid, including gasses, liquids, and/or gas-liquid combinations. In one or more arrangements, the fluid 240 can include water. Alternatively or in addition, other fluids can be sprayed through the nozzles 210. For example, one or more cleaning fluids (e.g., soap) and/or one or more pressurized gasses can be used.

The nozzle(s) 210 can include any number of nozzles, and the nozzles 210 can have any suitable configuration. The nozzles 210 can be described as being in one or more sets of nozzles 210. As used in connection with the nozzles 210, a "set" can include any number of nozzles, including one or more. The nozzles 210 can be configured to spray the fluid 240 such that the fluid 240 contacts portions of the inner panel 140. In some arrangements, the number, size, and/or configuration of the nozzles 210 can be chosen based on a desired spray coverage. For example, the number, size, and/or configuration of the nozzles 210 can allow for a substantial majority of the inner panel 140 to be sprayed. For example, "substantial majority" can include at least about 75% of a surface area of the inner panel 140, at least about 85% of a surface area of the inner panel 140, at least about 95% of a surface area of the inner panel 140, or at least about 99% of a surface area of the inner panel 140. Areas that are sprayed can include any area of the vehicle 100 in which fluid 240 contacts. For instance, portions of the inner panel 140 can be "sprayed" after the fluid 240 is redirected or "bounces off" other portions of the inner panel 140.

The nozzle(s) 210 can be located in any suitable position within the truck bed. In one or more arrangements, the nozzles 210 can be distributed around an outer portion of the truck bed. For example, the nozzles 210 can be operatively connected to the side portions 144 and/or the front portion 146 of the inner panel 140. The term "operatively connected," as used throughout this description, can include direct or indirect connections, including connections without direct physical contact. For example, as described in further detail below, the nozzle(s) 210 can be operatively connected to the inner panel 140 via connection with one or more conduit(s).

The nozzle(s) 210 can be located at any suitable elevational position. In some arrangements, the nozzle(s) 210 can be located near the top of the side portion 144 and/or the top of the front portion 146. Such a positioning can, in some examples, allow the fluid 240 to be sprayed in directions having a downward component in the elevational direction 12. In one or more arrangements, some of the nozzles 210 can be located near the bottom of the front portion 146. As described in further detail below, such a positioning can, in some examples, allow the fluid 240 to be sprayed in directions having a rearward component in the longitudinal direction 14. This can cause the fluid 240 sprayed by the nozzles 210 to be directed rearward, and out, from the truck bed. In some arrangements, there can be a set of nozzles 210 located at the side portions 144, a set of nozzles 210 at the front portion 146 located at a first elevational position, and a set of nozzles 210 at the front portion 146 located at a second elevational position. While arrangements are shown having nozzles 210 at one of two elevational positions, it is to be appreciated that the nozzles 210 can be located at varying elevational positions near the side portions 144 and/or the front portion 146.

In one or more arrangements, the system 200 can include one or more conduits 220 that are operatively connected to the truck bed and the nozzle(s) 210. The conduit(s) 220 can be in fluid communication with the nozzles 210. As used herein, "conduit" can include any structure that allows the transfer of fluid. For example, the conduit(s) 220 can include one or more tubes, channels, pipes, and/or cutouts.

The conduit(s) 220 can have any suitable size, shape, or configuration. The conduits 220 can be formed from any suitable material. In some arrangements, the conduit(s) 220 can be formed together with the inner panel 140. For example, the conduit(s) 220 can be molded together with the side portions 144, the front portion 146, and/or the nozzles 210. In some instances, the conduit(s) 220 and/or the inner panel 140 can be molded from the same material, such as a resin. Alternatively, the conduit(s) 220 can be formed separately and operatively connected to the inner panel 140 and/or the nozzles 210.

In one or more arrangements, the conduit(s) 220 can include one or more side conduits 222. The side conduit(s) 222 can run along the side of the truck bed. For instance, the side conduit(s) 222 can be formed near an outer surface of the side portion 144 and can be located between the side portion 144 of the inner panel 140 and the outer side panel 112.

In one or more arrangements, the conduit(s) 220 can include one or more front conduits. The front conduit(s) can include a top conduit 224 and a bottom conduit 226. The top conduit 224 can fluidly connect one or more nozzles 210 located near the top of the front portion 146. The bottom conduit 226 can fluidly connect one or more nozzles 210 located near a bottom of the front portion 146. In some arrangements, the conduit(s) 220 can include connector portions 228 that fluidly connect the top conduit 224 and the bottom conduit 226.

In one or more arrangements, the system 200 can include one or more fluid inlets 230 operatively connected to the vehicle. The inlet(s) 230 can be in fluid communication to the conduit(s) 220. The inlet(s) 230 can have any suitable size, shape, and/or configuration. In one or more arrangements, the inlet(s) 230 can be configured to receive fluid from a source external to the vehicle 100. For example, the inlet(s) 230 can include a liquid connector 232 and/or an air connector 234. The liquid connector 232 can be configured to receive any suitable liquid fluids into the system 200. In one example, the liquid connector 232 can be a water connector, such as a connector to receive a standard water hose. The air connector 234 can be configured to receive a pressurized air. For example, the air connector 234 can be a connector to receive connection to an air compressor. In one or more arrangements, the inlet(s) 230 can include connectors to receive a pressurized air/liquid mix. For example, the inlet(s) 230 can include a connector to receive connection to a typical power washer. In one or more arrangements, the inlet(s) 230 can be located on the exterior of the vehicle 100. For example, the inlet(s) 230 can be located at the outer side panel 112 of the side 110 of the truck bed.

In one or more arrangements, the inlet(s) 230 can include inlet(s) for fluid stored within the vehicle 100. For example, the vehicle can include a fluid storage tank (not shown) that can retain fluid for the system 200. The inlet(s) 230 can include the fluid storage tank and/or connections between the fluid storage tank and the conduit 220.

In one or more arrangements, the fluid storage tank can include a liquid storage tank. For example, the liquid storage tank can be a water tank located within the vehicle 100. Additionally, the fluid storage tank can include an air storage tank. The air storage tank can contain pressurized air. In some arrangements, power from a vehicle powertrain (e.g., engine, transmission, or batteries) can power an air compressor to provide pressurized air. The pressurized air can be delivered with the liquid through the inlet(s) 230 and into the conduit(s) 220.

Figure 2:
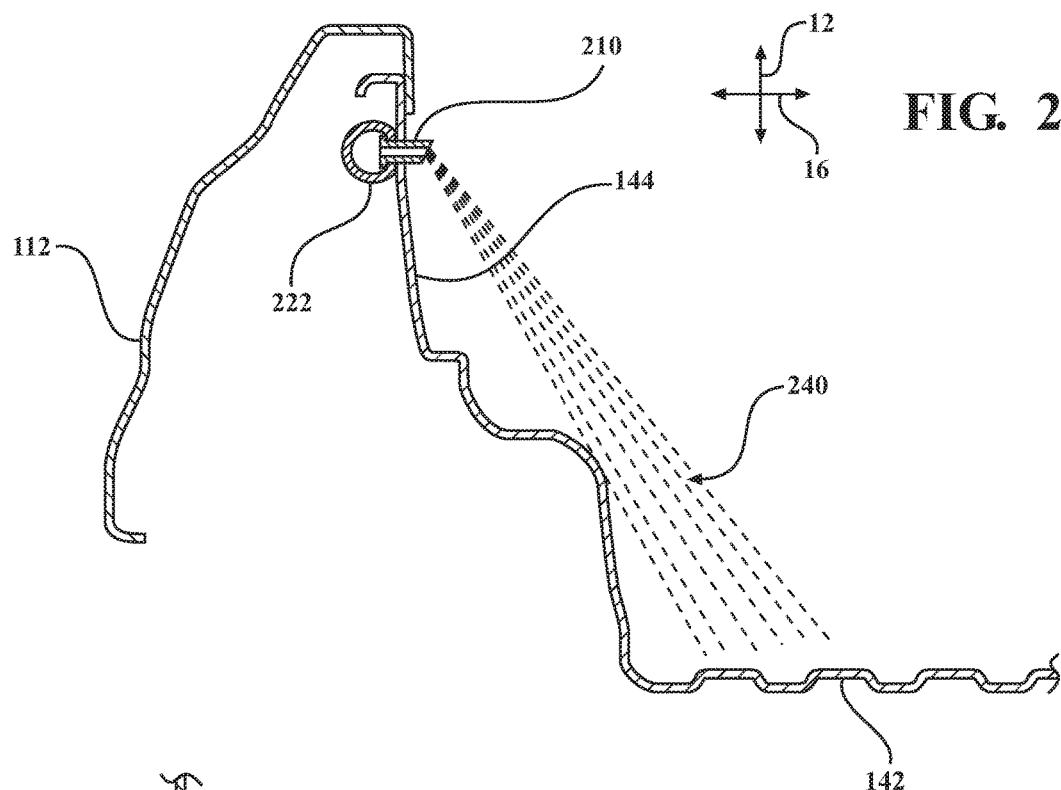
FIG. 2 is cross-sectional view of the vehicle of FIG. 1 taken along the lines 2-2.

With reference to FIG. 2, an example nozzle(s) 210, the side conduit 222, and the spraying of the fluid 240 can be further described. FIG. 2 shows a cross-sectional view of the section 2-2 of FIG. 1. The vehicle can include the outer side panel 112 and the inner panel 140 including the floor portion 142 and the side portion 144.

As shown in FIG. 2, the side conduit 222 can be located between the outer side panel 112 and the side portion 144 of the inner panel 140. In some arrangements, the side conduit 222 can be formed together with the inner panel 140. The side conduit 222 is in fluid communication with the example nozzle 210. Thus, the fluid 240 can flow through the side conduit 222 and be sprayed out of the nozzle 210. The spray of the fluid 240 can have a spray orientation. In one or more arrangements, the fluid 240 can have a spray orientation that generally includes an angle that is both inward in the lateral direction 16 and downward in the elevational direction 12. In such an arrangement, the fluid 240 can contact portions of the side portion 144 and the floor portion 142.

Figure 3:
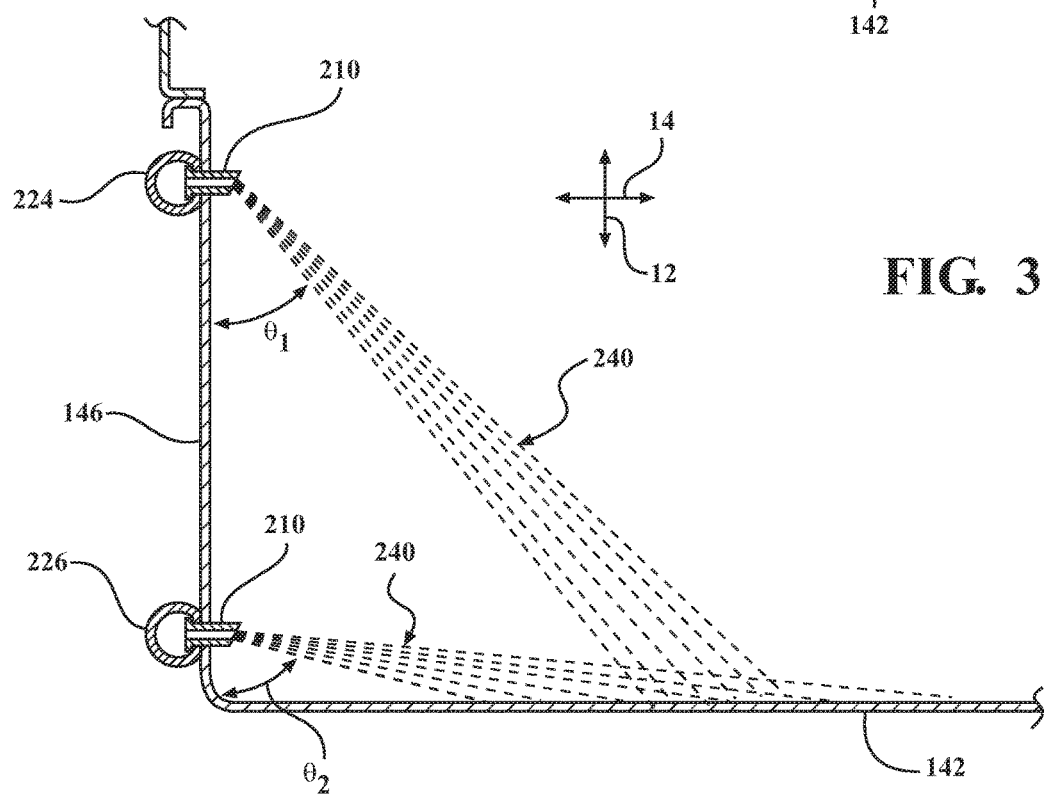
FIG. 3 is cross-sectional view of the vehicle of FIG. 1 taken along the lines 3-3.

With reference to FIG. 3 now, example nozzle(s) 210, the top conduit 224, the bottom conduit 226, and the spraying of the fluid 240 from a front portion of the truck bed can be further described. FIG. 3 shows a cross-sectional view of the section 3-3 of FIG. 1. The vehicle can include the inner panel 140 including the floor portion 142 and the front portion 146.

As shown in FIG. 2, each of the top conduit 224 and the bottom conduit 226 can be in fluid communication with one or more nozzles 210. In some arrangements, the spray orientation of the fluid 240 from the nozzle 210 at the top conduit 224 can be different from that coming from the nozzle 210 at the bottom conduit 226. For instance, the sprayed 240 coming from the top conduit 224 can be at an angle that is both inward in the longitudinal direction 14 and downward in the elevational direction 12. This angle can be represented by $\theta_1$, as measured from the front portion 146 of the inner panel 140. The sprayed fluid 240 coming from the bottom conduit 226 can be at an angle that is both inward in the longitudinal direction 14 and downward in the elevational direction 12, wherein the longitudinal component is much greater than the elevational component. This angle can be represented by $\theta_2$, as measured from the front portion 146 of the inner panel 140. Thus, the sprayed fluid 240 coming from nozzles 210 at the bottom conduit 226 can be flatter than the sprayed fluid 240 coming from the nozzles 210 at the top conduit 224.

In one or more arrangements, the nozzles 210 can be configured to move relative to the inner panel 140. In the examples shown in FIGS. 4A and 4B, the nozzle 210 can be located generally at the inner panel 140. Thus, features shown and described in relation to FIGS. 4A and 4B can apply to nozzles at any location of the truck bed.

Figure 4A:
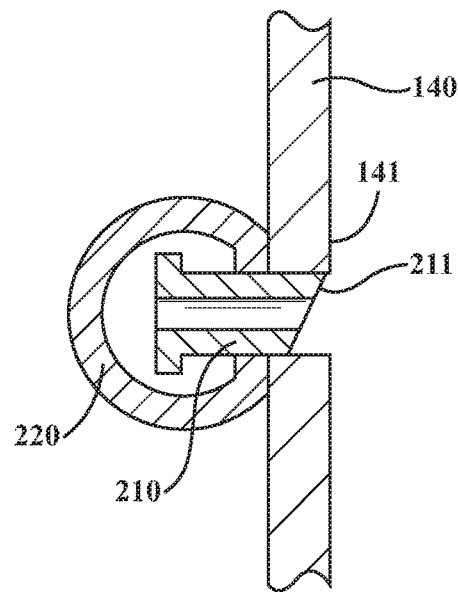
FIG. 4A is a partial cross-sectional view of a nozzle in a retracted position.

In one or more arrangements, the nozzles 210 can be configured to move between a retracted position and a deployed position. In some instances, while in the retracted position, the nozzles 210 can be positioned in a location closer to the conduit 220 than when in the deployed position. For instance, FIG. 4A shows the nozzle 210 in a retracted position. In this example, the nozzle 210 is moved outward away from the inside of the truck bed, and can be move partially inside the conduit 220. In one or more arrangements, the nozzle 210 can be positioned such that while in the retracted position, the nozzle 210 does not extend inward beyond the inner panel 140. For example, a distal end 211 of the nozzle does not extend beyond an inside surface 141 of the inner panel 140.

In one or more arrangements, the nozzles 210 can be positioned in the retracted position when fluid 240 is not moving through the system 200. This can allow for cargo items to be stored within the truck bed without interference from, or damage to, the nozzles 210.

Figure 4B:
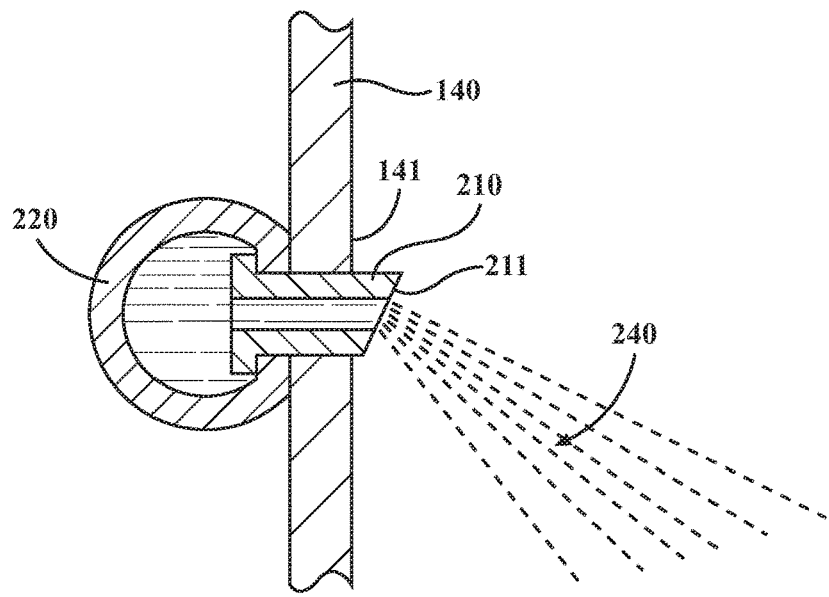
FIG. 4B is a cross-sectional view of the nozzle in a deployed position.

FIG. 4B shows the nozzle 210 in a deployed position. In one or more arrangements, the nozzle 210 can be moved such that the nozzle 210 extends inward (either in the lateral direction 16 or the longitudinal direction 14, for example) toward the inside of the truck bed when in the deployed position. In some instances, the nozzle(s) 210 can extend inward beyond the inner panel 140. For example, the distal end 211 of the nozzle 210 can extend inward past the inside surface 141 of the inner panel 140.

In one or more arrangements, the nozzles 210 can be positioned in the deployed position when fluid 240 is moving through the system 200. This can allow for the fluid 240 to be directed in the spray orientations described above without interference from the inner panel 140.

The nozzle 210 can be caused to be moved between the retracted and deployed positions in any suitable manner. In some arrangements, the pressure applied by the fluid 240 can cause the nozzles 210 to be moved into the deployed position. For example, the nozzles 210 can be biased towards a retracted position and the pressure of the fluid 240 can move the nozzles 210 into the deployed position. The nozzles 210 can be biased toward the retracted position in any manner. For example, the system can include one or more springs (not shown) that bias the nozzle toward the retracted position. Alternatively or in addition, one or more elements can cause movement of the nozzles. For example, as described in greater detail below, one or more controllers can cause one or more actuators to move the nozzles 210 between the retracted position and the deployed position.

While two positions are shown in FIGS. 4A and 4B, it is to be contemplated that the nozzles 210 can be positioned in any position between the retracted position and the deployed position. For example, the nozzles 210 can be positioned into one or more intermediate positions that are between the retracted position and the deployed position. In some instances, this can allow the sprayed fluid 240 to be directed at different areas within the bed based on the positioning of the nozzles.

In one or more arrangements, the nozzles 210 can be configured to move such that the spray pattern of the nozzles 210 changes over time. For example, the nozzles 210 can be configured to oscillate. As used herein, "oscillate" can include any condition in which the fluid 240 being sprayed by the nozzle 210 changes direction over a period of time. The nozzles 210 can have any suitable configuration to allow for oscillation. For example, the nozzles 210 can be configured to oscillate through hydraulic, electric, and/or a combination of both hydraulic and electric, controls. The nozzles 210 can oscillate in any direction. For instance, the nozzles 210 can oscillate in an up-down motion, a side-to-side motion, and/or one or more rotational directions.

In one or more arrangements, the system 200 can be at least partially automated through the use of computing elements. For example, the system 200 can include one or more controllers to control the washing of the truck bed. The controllers can include any combination of processors and/or memory. The controllers can be operatively connected to one or more elements of the system 200, including one or more actuators, nozzles 210, conduits 220, and/or inlets 230.

In one or more arrangements, the controller can control when the system 200 is activated. For instance, the controller can be operatively connected to one or more actuators that can control one or more valves of the system. The controller can send signals to open/close valves that control the supply of the fluid 240 to the system 200.

In one example, the controller can control the time of washing. For instance, the controller can cause one or more actuators to cause a valve to open and allow spraying of the inner panel 140 for a predetermined duration. After the duration, the controller can cause the one or more valves to close. As used herein, "cause" or "causing" means to make, force, compel, direct, command, instruct, and/or enable an event or action to occur or at least be in a state where such event or action may occur, either in a direct or indirect manner.

In arrangements in which the system 200 includes a fluid storage tank, the controller can cause washing to occur automatically, or at predetermined times. For example, a user can schedule the system 200 to wash the truck bed at a particular time. The controller can cause elements of the vehicle powertrain to activate to provide pressure to the fluid 240.

In one or more arrangements, the system 200 can include one or more sensors to determine, assess, monitor, measure, quantify, and/or sense one or more aspects of the vehicle 100 and/or the system 200. For example, data acquired from the sensors can be used to determine whether the truck bed of the vehicle 100 is dirty and in need of a cleaning. Alternatively or in addition, data acquired from the sensors can be used to determine when the truck bed of the vehicle 100 is clean.

In some arrangements, data acquired from the sensors can be used to determine whether cargo is in the truck bed. The controller can use such data to stop and/or prevent the fluid 240 from being sprayed within the bed during such conditions.

In another example of a partially automated system 200, the controller can cause the nozzle(s) 210 to move. For instance, the controller can cause the nozzle(s) 210 to move between the retracted position and the deployed position. Alternatively or in addition, the controller can cause the nozzle(s) 210 to oscillate.

In one or more arrangements, the system 200 can include on or more input/output systems. An "input system" includes any device, component, system, element or arrangement or groups thereof that enable information/data to be entered into a machine. The input system can receive an input from a user, and the input can be used to control the system 200. For example, an input system within the vehicle 100 can allow a user to start, stop, and/or schedule washing of the truck bed.

Now that various potential systems, devices, elements, and/or components of the vehicle 100 and system 200 have been described, a non-limiting example of the method/operation of the system 200 can be described. In this example, the vehicle 100 can be a pickup truck with a truck bed that can include dirt or debris from use.

A user can park the vehicle 100. The user can supply a fluid 240 to the system 200 to wash the truck bed. This can include supplying water to the inlet(s) 230. This can cause the nozzles 210 to move from a retracted position into a deployed position. In one example, a standard water hose can connect to the liquid connector 232 of the inlet 230. Upon turning a water source on, water can be forced into the inlet 230. The water can move through the conduit(s) 220 that are integrated within the truck bed. The water can then move through the nozzle(s) and be sprayed into the truck bed.

In this example, the water pressure can be enough to force the water through the system 200 to clean the truck bed. In an alternative example, a user can also supply a pressurized air source to the inlet(s) 230. For instance, an air hose from an air compressor can be connected to the air connector 234 of the inlet 230. The combination of pressurized air and water can then cause the water to be moved through the system 200 and sprayed into the truck bed.

The nozzles 210 can be numbered and configured to spray a substantial majority of the truck bed. Further, the nozzles 210 can have spray orientations to allow the fluid 240, such as water, to be sprayed into the bed and moved rearward. This can result in at least some of the sprayed fluid 240 exiting the truck bed.

After a desired period of time, the user can turn off and disconnect a fluid supply (e.g., the water and/or air source). This in turn, stops the spraying of the fluid 240 through the nozzles 210. The removal of the fluid 240 can also allow the nozzles 210 to move from the deployed position to the retracted position. The user can then store cargo items within the truck bed and/or operate the vehicle 100.

It will be appreciated that arrangements described herein can provide numerous benefits, including one or more of the benefits mentioned herein. For example, arrangements described herein can provide easy methods for cleaning out the truck bed of a vehicle. The inlet(s) can provide convenience in supplying a cleaning fluid, such as a water source, to the system. Arrangements described herein can allow the substantial majority of the truck bed to be washed quickly and without getting a user wet/dirty. In some instances, nozzles can move between retracted and deployed positions. This can reduce and or eliminate interference between the system and cargo stored in the truck bed. Arrangements described herein can include nozzles with different elevational positions and different spray orientations. Such arrangements can cause the fluid used to wash the truck bed to be moved rearward and out of the truck during washing.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A washing system for a truck bed of a vehicle, the system comprising:
    one or more nozzles operatively connected to the truck bed, the one or more nozzles being fluidly connected to one or more conduits, the one or more conduits being internally integrated into the vehicle; and
    a fluid inlet fluidly connected to the one or more conduits, the fluid inlet being operatively connected with the vehicle and in fluid communication with the one or more nozzles via the one or more conduits,
    the fluid inlet being configured to receive a fluid and to route said fluid to the one or more nozzles for spraying into the truck bed.

2. The system of claim 1, wherein the one or more nozzles are operatively connected to an inner panel of the truck bed, the one or more nozzles including a first set of nozzles being located at a front portion of the inner panel and a second set of nozzles being located at a side portion of the inner panel.

3. The system of claim 2, wherein the first set of nozzles includes two or more nozzles, the two or more nozzles being operatively connected to the front portion of the inner panel at two or more elevational positions.

4. The system of claim 3, wherein the first set of nozzles each have a spray orientation toward the truck bed during operation.

5. The system of claim 1, wherein the one or more conduits are formed integrally with the truck bed.

6. The system of claim 1, wherein the one or more nozzles are integrally connected to the truck bed through at least the one or more conduits.

7. The system of claim 1, wherein one or more nozzles are configured to move between a retracted position and a deployed position, the one or more nozzles being in the retracted position when fluid is not being sprayed and in the deployed position when fluid is being sprayed.

8. The system of claim 7, wherein the one or more nozzles move between the retracted position and the deployed position based on a fluid pressure.

9. The system of claim 1, wherein the one or more nozzles are configured to oscillate as fluid is being sprayed.

10. The system of claim 1, wherein the one or more nozzles are integrated into the truck bed and configured to maintain a spray orientation directed at the truck bed.

11. A vehicle having a washing system for a truck bed, the vehicle comprising:
    the truck bed defined at least in part by an inner panel having a front portion, two opposing side portions, and a floor portion; and
    a washing system, the system comprising:
        one or more nozzles operatively connected to the truck bed and fluidly connected to one or more conduits, the one or more conduits being internally integrated into the vehicle; and
        a fluid inlet fluidly connected to the one or more conduits, the fluid inlet being operatively connected with the vehicle and in fluid communication with the one or more nozzles via the one or more conduits, the fluid inlet being configured to receive a fluid and to route said fluid to the one or more nozzles for spraying into the truck bed.

12. The vehicle of claim 11, wherein the one or more nozzles include a first set and a second set of nozzles operatively connected to the front portion of the inner panel, the first set of nozzles being located at a first elevational position and the second set of nozzles being located at a second elevational position, the second elevational position being higher in an elevational direction than the first elevational position.

13. The vehicle of claim 12, wherein a spray orientation of the first set of nozzles is flatter than a spray orientation of the second set of nozzles.

14. The vehicle of claim 11, wherein the one or more conduits are formed integrally with the truck bed.

15. The vehicle of claim 11, wherein the one or more nozzles are integrally connected to the truck bed through at least the one or more conduits.

16. The vehicle of claim 11, wherein one or more nozzles are configured to move between a retracted position and a deployed position, the one or more nozzles being in the retracted position when fluid is not being sprayed and in the deployed position when fluid is being sprayed.

17. The vehicle of claim 16, wherein the one or more nozzles move between the retracted position and the deployed position based on a fluid pressure, and wherein the one or more nozzles do not extend inward past the inner panel when in the retracted position.

18. The vehicle of claim 11, wherein the one or more nozzles are configured to oscillate as fluid is being sprayed.

19. The vehicle of claim 11, wherein the one or more nozzles are integrated into the truck bed and configured to maintain a spray orientation directed at the truck bed.

20. A washing system for a truck bed of a vehicle, the truck bed being at least partially defined by an inner panel having a front portion, two opposing side portions, and a floor portion, the system comprising:
    a first set of nozzles integrally connected to the front portion at a first elevational position;
    a second set of nozzles integrally connected to the front portion at a second elevational position, the second elevational position being higher in an elevational direction than the first elevational position;
    one or more conduits internally integrated into the vehicle and operatively connected to the inner panel, the one or more conduits being in fluid communication with the first set of nozzles and the second set of nozzles; and
    a fluid inlet fluidly connected to the one or more conduits, the fluid inlet being operatively connected with the vehicle and in fluid communication with the first set of nozzles and the second set of nozzles, the fluid inlet configured to receive at least one of a liquid and an air, the fluid inlet being configured to receive a fluid and to route said fluid to the first and second set of nozzles for spraying into the truck bed.

* * * * *